United States Patent [19]

Mailloux

[11] Patent Number: 5,416,489
[45] Date of Patent: May 16, 1995

[54] SUBSTITUTION PROCEDURE AND APPARATUS FOR PHASED ARRAY ERROR CORRECTION

[75] Inventor: Robert J. Mailloux, Wayland, Mass.

[73] Assignee: The United States of America as represented by the Secretary of the Air Force, Washington, D.C.

[21] Appl. No.: 221,720

[22] Filed: Mar. 25, 1994

[51] Int. Cl.6 ............................................. G01S 7/40
[52] U.S. Cl. ..................................................... 342/173
[58] Field of Search ........................ 342/360, 173, 174; 455/8, 67.1, 115

[56] References Cited

U.S. PATENT DOCUMENTS

| | | | |
|---|---|---|---|
| 4,453,164 | 6/1984 | Patton | 343/360 |
| 4,559,605 | 12/1985 | Norsworthy | 364/726 |
| 4,972,314 | 11/1990 | Getzinger et al. | 364/200 |
| 5,083,131 | 1/1992 | Julian | 342/372 |
| 5,254,998 | 10/1993 | LaBerge et al. | 342/173 |

Primary Examiner—Theodore M. Blum
Attorney, Agent, or Firm—William G. Auton; Jacob N. Erlich

[57] ABSTRACT

A technique that enables array error correction by replacing the signals from failed elements with processed signals derived from operating elements. The procedure is shown to be useful in a multisignal environment. Expressions are derived that give the signal to noise ratio of arrays with any number of failed elements with replaced signals. These relations are used to investigate the counterintuitive limiting case in which all the signals of an array are replaced by the reproduced signals.

3 Claims, 2 Drawing Sheets

SUBSTITUTION PROCEDURE AND APPARATUS FOR PHASED ARRAY ERROR CORRECTION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to phased array antennas more specifically the invention pertains to a procedure and apparatus that can correct for failures in a phased array that is controlled by a digital beamformer.

Present day array antennas provide some degree of monitoring to determine the state of operation of individual elements of the array, Failed or failing devices are replaced during the system off-time or during scheduled maintenance periods. Recently there has been an increased interest in developing methods to improve the patterns of arrays in the presence of failed or partially failed elements by re-optimising the weights applied to the remaining array elements to compensate for the failures.

The task of correcting the output of phased array antennas with failed antenna elements is alleviated, to some extent, by the systems disclosed in the following U.S. Patents, the disclosures of which are incorporated herein by reference:

U.S. Pat. No. 4,453,164 issued to Patton;
U.S. Pat. No. 4,559,605 issued to Norsworthy; and
U.S. Pat. No. 4,972,314 issued to Getzinger et al.

The above-cited references all disclose signal processing systems that process the electromagnetic signals received by phased array antennas. Unfortunately, a need remains to enhance the signals received by antennas which have missing or failed antenna elements. The present invention is intended to satisfy that need.

SUMMARY OF THE INVENTION

The present invention includes both an apparatus and an array error correction process that replaces signals lost from failed elements with processed signals derived from operating elements. This process is used in combination with a phased array antenna which receives signals with an array of elements ei which have uniform spacing between them. Either any element em, its missing signal Fm is recreated from the signal Fn or an active element en using the equation:

$$F_m = \sum_p [A_p X_p e^{jn\Delta p}] e^{j(m-n)\Delta p}$$

where the terms in the brackets are the received signals from the incident waves at the nth terminal. This expression can be used for replacing the signal at any failed mth element using the received time dependent signal at the nth element, where $A_p$ equals the complex amplitude of a number P of plane wave sources of radiation;
$X_p = \exp(jW_p t)$; and
$\Delta p = 2\pi U_p$, $$\frac{dx}{\lambda p};$$

$U_p = \sin \theta_p$; and
$\lambda p$ = the wavelength of the plane wave arriving at angle $\theta p$.

This process is on iterative procedure which entails receiving the plane wave in the form of a set of element signals; identifying the missing element $e_m$ in the array; selecting an element $e_n$ with its signal Fn for recreation of the missing signal; recreating the missing signal; and adding the recreated signal to the set of element signals. Just as image enhancement techniques have helped refine optical signals, this process can enhance the electromagnetic signals of radar and communication systems that use phased array antennas.

It is an object of the present invention to enhance the electromagnetic signals received by phased array antennas that have missing or failed elements.

It is another object of the invention to provide an array error correction process that replaces signals lost from failed elements with processed signals derived from operating elements.

These objects together with other objects, features and advantages of the invention will become more readily apparent from the following detailed description when taken in conjunction with accompanying drawings wherein like elements are given like reference numerals throughout.

DETAILED DESCRIPTION OF THE PREFERRED EMBODIMENT

The present invention is a method and apparatus for improving the received radiation pattern of an array with failed elements. For the purposes of this work the elements will be assumed to be completely failed (and have zero signal output). The method can be applied in the presence of a multiplicity of external noise or jamming signals, and involves only linear processing that must be performed at a rate compatible with the information bandwidth. In its present form the technique assumes that all array active element patterns are the same.

The present invention may be considered a three-step process for enhancing the electromagnetic signal received by a phased array antenna which has active antenna elements, and one or more failed antenna elements. The first step entails using the active antenna elements to capture the electromagnetic signal. The second step entails identifying the missing and failed antenna elements. The third step entails replacing lost signals that are missing due to the failed antenna elements by a set of recreated signals derived from the signals received by the active antenna elements. As discussed below, this process is possible when the antenna elements have a distribution with a uniform spacing, so that missing signals are predictable.

Figure 1:
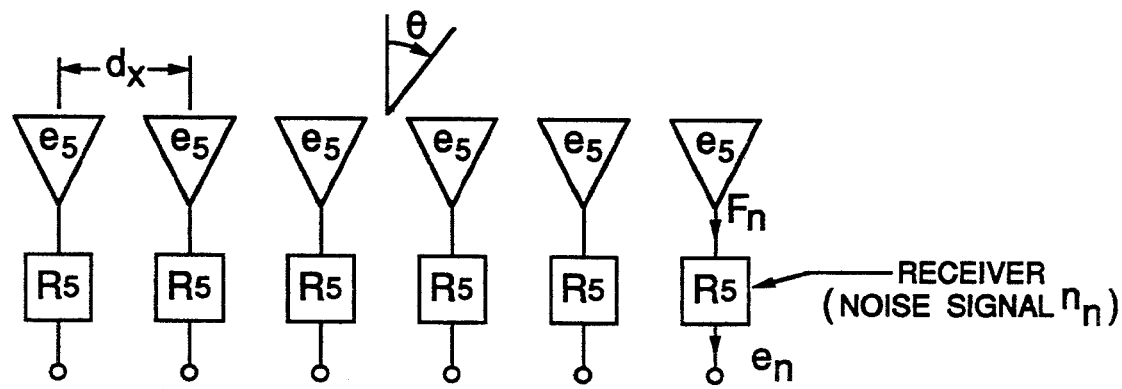
FIG. 1 is an illustration of a linear array of antenna elements which have uniform spacing.

In order to understand the present invention, the reader's attention is directed towards FIG. 1, which is an illustration of a phased array antenna with a linear array geometry. It contains six receive antenna elements (e1−eN) which are each connected to their own receiver (R1—RN) which receives and amplifies received signals.

All of the signals received by the elements will have the same phase only when the received signal has a trajectory at boresight, which is normal to the plane of the array, which is normal to the plane of the array. This does not happen often. Most times, signals are received at an angle with respect to the array, and these are phase shifts between the different antenna parts that correspond with the delay in time between the receipt of the signal by the separate elements. The principle of the present invention is that since the distance between all of the elements is both known and uniform, the phase difference at different antenna ports can be predicted, and the signals of failed elements can be similarly predicted and synthesized.

For array correction in multiple signal environment, the signal at the nth receiver port of an equispaced linear array antenna (FIG. 1) is $$e_n = n_n + F_n \qquad (1)$$

where $n_n$ is the receiver noise and $F_n$ is the signal received at the antenna port of the nth element.

If a number P of plane wave source of radiation with complex amplitude $A_p$ are incident on the array, from angles $\theta$ with direction cosines $u_p = \sin \theta_p$ the output signal at the nth antenna port is $$F_n = \sum_{p=1}^{P} A_p X_p e^{jn\Delta_p} \qquad (2)$$

where $$\Delta_p = 2\pi u_p \frac{d_x}{\lambda_p} \qquad X_p = \exp(j\omega_p t) \qquad (3)$$

The digital beamformer weights each nth port signal to form the array output signal E $$E = \sum_n w_n e_n = W^T e \qquad (4)$$

where W is the column vector of weights $w_n$ and $e_n$ is the column vector of signal e. The weights $w_n$ are in general complex and are chosen to synthesize a particular array pattern.

In the absence of noise the signal at any mth port is related to that at the nth port by the relation $$F_m = \sum_p [A_p X_p e^{jn\Delta_p}] e^{j(m-n)\Delta_p} \qquad (5)$$

where the terms in the brackets are the received signals from the incident waves at the nth terminal. This expression can be used for replacing the signal at any failed mth element using the received time dependent signal at the nth element. However, to do this, these individual wave contributions must be separated from the combined received signal at element n. This is accomplished by the following iterative scheme that will illustrate the procedure for solving for the bracketed contribution for p=1.

Starting with a section of the array where there are no failing elements, and assuming that we know the angle of arrival a centre RF frequency (or the RF phase progression, across the array) for each of the sources, the signal due to one of the waves (say p=r) at any kth element can be elemented to combining the signal from the kth element and part of the (k—1)st element. To carry out this procedure, we form the following expression at each of P elements, starting at the nth at the kth element $$F_k^1 = F_k^0 - e^{j\Delta} F_{k-1}^0 \qquad (6)$$

for k=n, n—1, n—2 ... n—(P—1).

In this expression, the superscript 1 indicates the result the first iteration, and the superscript zero represents the original received Signals $F_k$. The results of the first iteration can be shown to be $$F_k^1 = \sum_{p=1}^{P} C_p(r) A_p X_p e^{jk\Delta_p} \qquad (7)$$

for k=n, n—1, n—2...n—(P—2) where the constant $C_p(r)$ is given $$C_p(r) = 2j \exp\left[-\frac{j}{2}(\Delta_p - \Delta_r)\right] \sin[\tfrac{1}{2}(\Delta_p - \Delta_r)] \qquad (8)$$

At any 'in band' frequency with dx, chosen to avoid grating lobes, $C_p(r)$ is only zero for the wave p=r.

This procedure can be applied iteratively to remove the contributions of other waves. If P signals are present, we would need to use P element ports, and perform P—1 iterations to isolate the contribution from one of the signals. The output of the 9th iteration is, at the nth port, $$F_n^q = \sum_{p=1}^{P} K^q A_p X_p e^{jn\Delta_p} \qquad (9)$$

where $$K^q = \prod_{i=1}^{q} C_p(r_i) \qquad (10)$$

and each $C_p(r)$ is given by eqn. 8, with the subscript i to designate the ith iteration, and the exclusion of the wave $p = r_i$.

Figure 2:
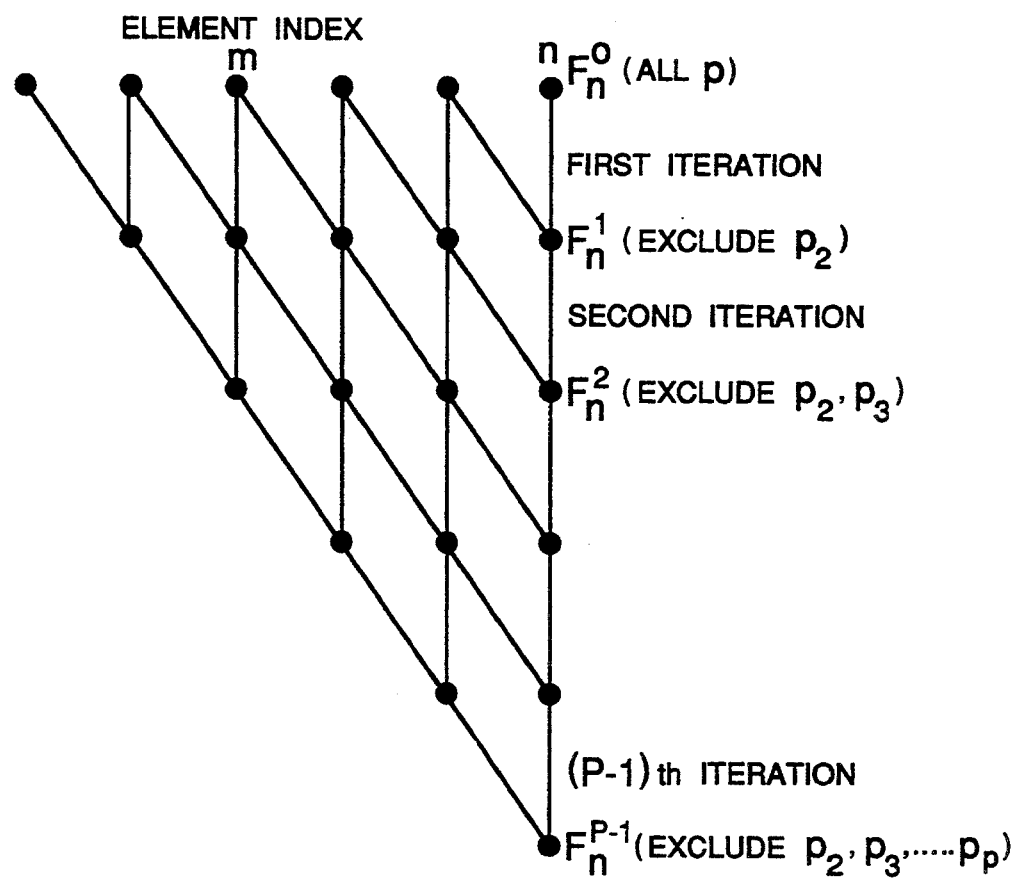
FIG. 2 is an illustration of the iterative approach of array error correction.

FIG. 2 is an illustration of the iterative procedure of array correction. The iterative procedure is illustrated schematically in FIG. 2 and separates: out one incident signal for each iteration. This procedure is essentially the same as the null forming tree which forms array level nulls at a number of angles by means of a similar iteration. Here the groups of elements used need not be the whole array, but must include at least 2 elements. To obtain the coefficient in eqn. 5 corresponding to p=1, we form the iterates $F^q$ using the $C_p(r_i)$ for all the wave r, except p=1. Because $K^q$ is a zero for all of these waves, the contribution from waves at all $u_p$ directions except $u_1$ are removed. This procedure requires P—1 iterations, and at the end of the remaining signal at the nth element is $$[A_1 X_1 e^{jn\Delta_1}] = \frac{F_n^{P-1}}{K^{P-1}} \qquad (11)$$

which is the required term (for p=1) in the brackets of eqn. 5. This procedure needs to be repeated (or processed in parallel) P times to solve for all of the terms (for p=1−P) needed in the various bracketed contributions in eqn. 5.

Correction in presence of receiver noise is performed as follows. Obviously the perfect correction of signals from all failed array ports would lead to a perfect array, even with multiple failures. Because this is counterintuitive, it is helpful to consider the limitations imposed by receiver noise.

For simplicity, assume that the signal plus noise at the nth element is given by eqn 1, with A/D quantisation effects neglected. In this case the array signal to noise ratio is, using eqns. 1 and 4.

$$\frac{S}{N} = \frac{\overline{E_s^* E_s}}{\overline{E_N^* E_N}} = \frac{W \dagger M_s W}{W \dagger M_N W} \quad (12)$$

where the superscript † means conjugate transpose, and the overbar indicates a time average. M is the covariance matrix.

$$M = \overline{e^* e^T} \quad (13)$$

Assuming that the noise terms are not correlated with the incident waves, and the incident waves are not correlated with each other, the terms, in the noise covariance matrix $M_N$ are $$m_N(s, t) = |n_s|^2 \delta(s, t) + \overline{n_s^* n_t}[1 - \delta(s, t)] + \sum_{p \neq 1} |A_p|^2 e^{j\Delta p(t-s)} \quad (14)$$

where δ(st) is the Kroneker delta function.

This expression (eqn. 18) still contains the noise contributions due to the interfering signals (p≠1).

The signal power S includes only the contribution from the wave (p=1) and is $$|A_1|^2 |\Sigma w_t|^2 \quad (15)$$

For the array without errors and deterministic weights $w_t$ the S/N is given by the above ratio with the central term zero, because the noise due to the various receivers is assumed uncorrelated. With only a single incident signal $A_1$ (that is all undesired signals $A_p$ are zero), and all noise contributions equal, then S/N reduces to $$\frac{S}{N} = \frac{|A_1|^2 |\Sigma w_t|^2}{|n_n|^2 \Sigma |w_t^2|} = \frac{|A_1|^2}{|n_n|^2} g_A \quad (16)$$

where $g_A$ is the array factor gain.

$$g_A = \frac{|\Sigma w_t|^2}{\Sigma |w_t^2|} \quad (17)$$

Note that S/N here is the array factor gain times the S/N of an individual array element.

In the counterintuitive limit in which all but one receiver is assumed to have failed, and all the other signals are reconstructed from data of a single receiver, and in the absence of external interfering signals, it is assumed that the noise is now completely correlated, and S/N reduces to $$\frac{S}{N} = \frac{|A_1|^2}{N_n} \quad (18)$$

Here, not surprisingly, S/N is the same as that of an individual element. This test case gives some indication of the limitations of the technique. The signals from a number of failed elements can be reconstructed but with a generally decreasing S/N level as more elements fail. In the limit, when only one signal is real and all the others are simulated, S/N is the same as for a single element.

As described above, the present invention includes both an apparatus and an array error correction process that replaces signals lost from failed elements with processed signals derived from operating elements. This process is used in combination with a phased array antenna which receives signals with an array of elements e; which have uniform spacing between them. When any element $e_m$, its missing signal $F_m$ is recreated from the signal $F_m$ of an active element $e_n$ using the equation:

$$F_m = \sum_p [A_p X_p e^{jn\Delta p}] e^{j(m-n)\Delta p} \quad (19)$$

where the terms in the brackets are the received signals from the incident waves at the nth terminal. This expression can be used for replacing the signal at any failed mth element using the received time dependent signal at the nth element, where $A_p$ equals the complex amplitude of a number P of plane wave sources of radiation;

$X_p = \exp(jW_p t)$; and $$\Delta p = 2\pi u_p \frac{dx}{\lambda p};$$

$u_p = \sin \theta_p$; and $\lambda_p$ = the wavelength of the plane wave arriving at angle $\theta_p$.

Figure 3:
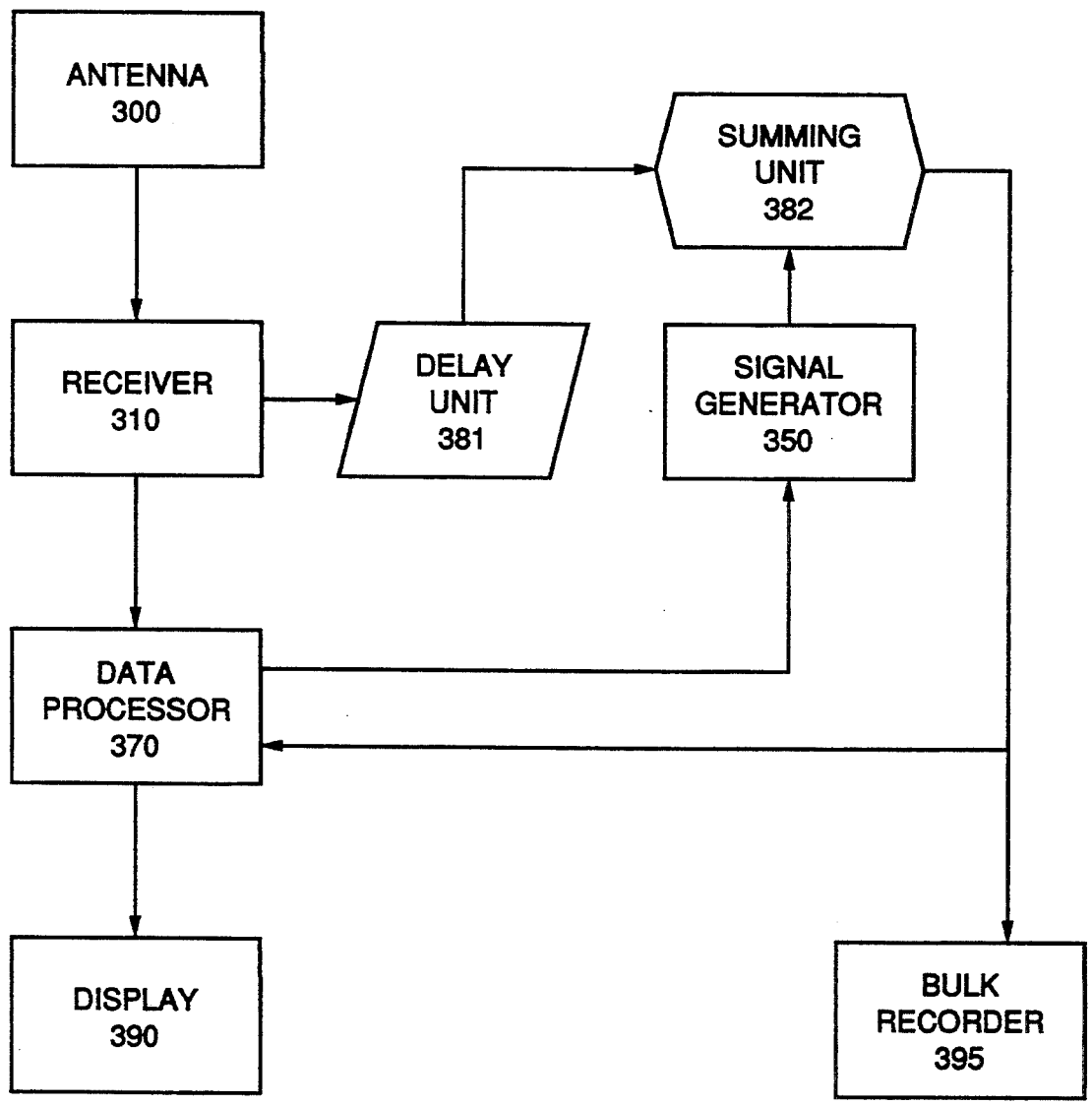
FIG. 3 is a block diagram of an error correction system that uses the present invention.

There is an enormous variety of alternatives of components making up the system that can implement the process described above. One such apparatus is the present invention which is illustrated in FIG. 3 and contains: an antenna 300, radar receiver 310, data processor 370, display 390, delay element 381, signal generator 350, summing unit 382, and bulk recorder memory 395.

The antenna 300 is a phased array antenna which has antenna elements e1−eN uniform distribution of spacing between them, as depicted in FIG. 1. The phased array antenna receives a plane wave P which is received at angle $\theta_p$ with respect to the plane of the array.

The radar receiver 310 receives and amplifies the signals received by the antenna 300, as shown in FIG. 1. This is a standard device that outputs the amplified signals of the elements to both the data processor 370 and the delay unit 381. The data processor identifies the characteristics of the received signal and uses the process described above so that it replaces signals lost from failed elements with processed signals derived from operating elements using equation 5.

The recreated signal is actually created by the signal generator 350 and summed by the summing unit 382 with the original received signal from the delay unit 381 for storage in the bulk recorder memory 395 and for reinput into the data processor 370. The final signal is an enhanced signal that makes up for the errors or deficiencies in the signal actually received, when these deficiencies are caused by failed antenna elements. For this reason, the present invention can be considered a signal enhancement system as well as an error correction system.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A signal enhancement process for use with a phased array antenna which receiver an electromagnetic signal with an array of antenna elements given by ei where i is an integer from 1 to N and N is a total number of antenna elements in the phased array antenna, said signal enhancement process comprising the steps of:

receiving said electromagnetic signal using a set of active antenna elements to produce a set of active element signals;

identifying missing and failed antenna elements for the phased array antenna; and replacing lost signals that are missing due to an existence of failed antenna elements with a set of recreated signals that are derived from said active element signals, wherein said replacing step further comprises:

a recreating substep in which said lost signals are generated using a signal generator that outputs a set of replacement signals, and wherein said recreating substep is performed using a data processor with said signal generator such that when any element $e_m$ is lost, its missing signal $F_m$ is recreated from a signal $F_m$ of an active element en using an equation given by:

$$F_m = \sum_p [A_p X_p e^{jn\Delta p}] e^{j(m-n)\Delta p}$$

where $A_p$ equals a complex amplitude of a number P of plane wave sources of radiation;

$X_p = \exp(jw_p t)$; and $$\Delta p = 2\pi u_p \frac{dx}{\lambda_p};$$

$u_p = \sin\theta_p$; and $\lambda_p$ = a wavelength of a plane wave that arrives at angle $\theta_p$, and wherein said replacing step includes a combining substep in which said set of replacement signals from said signal generator are combined with said set of active element signals to produce thereby an enhanced set of received signals.

2. A signal enhancement process for use with a phased array antenna which receiver an electromagnetic signal with an array of antenna elements given by ei where i is an integer from 1 to N and N is a total number of antenna elements in the phased array antenna, said signal enhancement process comprising the step of:

receiving said electromagnetic signal using a set of active antenna elements to produce a set of active element signals;

identifying missing and failed antenna elements for the phased array antenna; and replacing lost signals that are missing due to an existence of failed antenna elements with a set of recreated signals that are derived from said active element signals, wherein said replacing step further comprises:

a recreating substep in which said lost signals are generated using a signal generator that outputs a set of replacement signals, and wherein said recreating substep is performed using a data processor with said signal generator such that when any element $e_m$ is lost, its missing signal $F_m$ is recreated from a signal $F_m$ of an active element en using an equation given by:

$$F_m = \sum_p [A_p X_p e^{jn\Delta p}] e^{j(m-n)\Delta p}$$

where $A_p$ equals a complex amplitude of a number P of plane wave sources of radiation;

$X_p = \exp(jw_p t)$; and $$\Delta p = 2\pi u_p \frac{dx}{\lambda_p};$$

$u_p = \sin\theta_p$; and $\lambda_p$ = a wavelength of a plane wave that arrives at angle $\theta_p$, and wherein said replacing step includes a combining substep in which said set of replacement signals from said signal generator are combined with said set of active element signals to produce thereby an enhanced set of received signals.

3. A signal enhancement system comprising:

a means for receiving an electromagnetic signal using a set of active antenna elements to produce a discrete set of active element signals, said receiving means also having at least one antenna element which is subject to failure, and wherein said receiving means includes a phased array antenna such that said active antenna elements have a distribution with a uniform spacing, and which output a set of element signals, and a receiver unit which is electrically connected said active antenna elements, said receiver unit outputting said set of active element signals by receiving and amplifying said set of element signals; and a means for replacing lost signals that are missing due to an existence of failed antenna elements with a set of recreated signals that are derived from said active element signals, wherein said replacing means comprises a signal generator which generates said set of recreated signals based upon a signal description; and a data processor that provides said signal description to said signal generator such that when any element em is lost, its missing Fm is recreated from a signal Fm of an active element en using an equation given by:

$$F_m = \sum_p [A_p X_p e^{jn\Delta p}] e^{j(m-n)\Delta p}$$

where $A_p$ equals a complex amplitude of a number P of plane wave sources of radiation;

$X_p = \exp(jw_p t)$; and $$\Delta p = 2\pi u_p \frac{dx}{\lambda_p};$$

$u_p = \sin\theta_p$; and $\lambda_p$ = a wavelength of a plane wave that arrives at angle $\lambda_p$; and a means for summing said set of recreated signals from said signal generator with said set of active element signals.

* * * * *